INVENTOR
EMMETT B. ASMUS
SEWARD L. VAN PETTEN

United States Patent Office 3,532,620
Patented Oct. 6, 1970

3,532,620
POWER RECOVERY FROM CATALYST REGENERATION GASES
Emmett B. Asmus, Olympia Fields, and Seward L. Van Petten, Edwardsville, Ill., assignors, by mesne assignments, to Sinclair Research, Inc., New York, N.Y., a corporation of Delaware
Filed Sept. 28, 1967, Ser. No. 671,371
Int. Cl. C10g *13/00*
U.S. Cl. 208—113                                10 Claims

ABSTRACT OF THE DISCLOSURE

Expansion turbine power recovery from regeneration gases in the oxidative regeneration of crystalline aluminosilicate catalysts is improved by cooling regenerator gases to below about 875° F. At higher temperatures, the crystalline aluminosilicate fines form deposits on the turbine surfaces which necessitate shut-down after an unreasonably short period.

---

Figure 1:
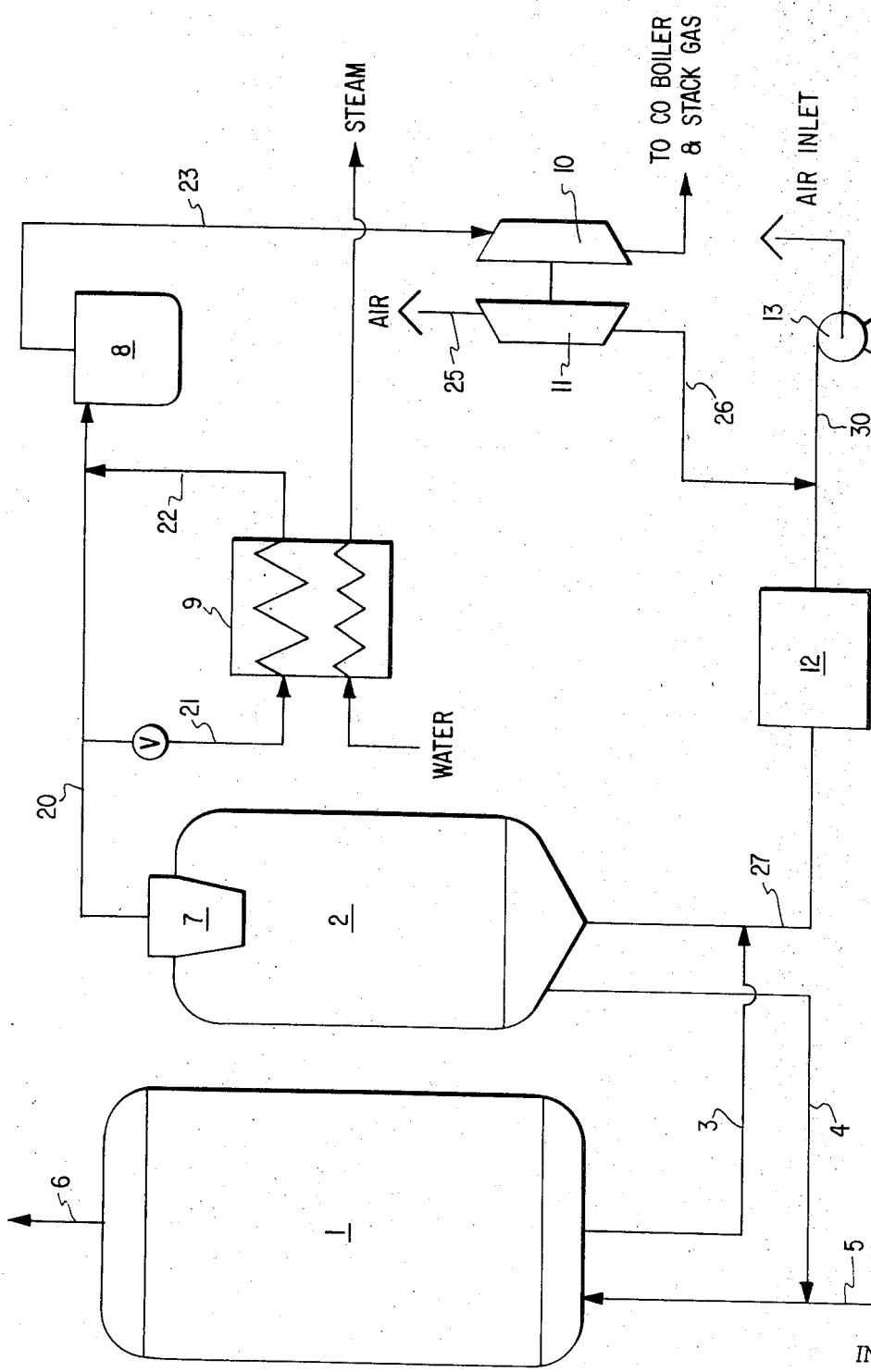

This application relates to the recovery of power from the hot gases resulting from oxidative catalyst regeneration. More particularly, it relates to the recovery of power from regeneration gases in a gas expansion turbine. Still more particularly, it relates to power recovery from regeneration gases in the regeneration of crystalline aluminosilicates.

Catalytic cracking is an example of hydrocarbon conversion processes which utilize massive reactors and catalyst inventories on the order of up to 1000 tons or more. The catalyst is usually regenerated on a continuous basis by contacting fouled catalyst in a separate regenerator with large volumes of compressed air or other source of oxygen at elevated temperatures and pressure to remove coke or other carbonaceous deposits by combustion. The requirements of the regeneration system for compressed air have called for extensive investment in facilities required to operate the air compressors. Power facilities have become one of the major expenses of catalytic cracking.

The air supplied to the regeneration zone burns the carbanoceous deposits on the catalyst and exhausts at high temperature and elevated pressure. For instance, the regeneration gas will typically emerge from the regeneration zone at temperatures in excess of 1000° F., and range up to 1300° F. or even higher, while pressures range from about 10 p.s.i.g. up to about 35 p.s.i.g. Thus the gases emerging from the regeneration zone represent a large energy potential which may be utilized to recoup a part of the power invested in the system in compressing the air. In some cases, enough energy is released in the exothermal oxidative regeneration process that, if properly recovered or harnessed, a net gain may be realized in the regeneration, thus supplying a surplus of power for utilization in other operations.

Waste gas turbines have been suggested as a means for utilizing the regenerator waste gases in such systems and have been moderately successful in some applications. Typically, the gases emerging from the regeneration zone at high temperature and elevated pressure are passed to an expansion turbine. The turbine then supplies power to an air compressor, serving as a source of compressed air for the regeneration process, or in other cases this turbine can provide power to other equipment, either in combination with or separate from unit air compression.

Numerous problems have limited the operation of such turbine systems. Notably, contamination of the regeneration waste gas with catalyst fines has resulted in severe erosion problems in the turbine, and has required extensive separation means, such as cyclone separators, to remove solids from the gas. Even so, some fines still pass the separators and continue to present erosion problems. It has been found that fines not effectively removed are mostly those of very small particle size, i.e., below about 20 microns, and an appreciable amount below 1 micron. It is to the erosion problem that the art has devoted much of its attention, and with some success. The advent of different catalyst systems for hydrocarbon conversions has, however, substantially altered the problems of such power recovery systems.

The developments in processes utilizing the crystalline aluminosilicates as catalysts have been and are gaining rapid acceptance throughout the industry. While these catalysts are advantageously used in hydrocarbon conversion processes, the recovery of power from regeneration waste gases in such systems involves a significant new problem. While there is no unusual change in the amount of catalyst fines passing through the separation zone, e.g., cyclone separators, the problem produced by such fines which do pass is totally different than that previously faced in turbine power recovery systems. The fines tend to deposit on the stationary and moving blades of the turbine, and on surrounding housing surfaces, producing severe imbalance and vibration, causing loss of power, rubbing of surfaces, reduced speed potential, and the like, thus requiring frequent shutdown. The problem has proved to be so severe that the operation of turbine power recovery systems has been restricted to very short periods, on the order of two weeks or less, depending on the specific mechanical characteristics of the turbine used. In all cases the run length is reduced to an unreasonable and uneconomic length of time.

It has been found that the rapid formation of deposits on the turbine blades and in the turbine blade area is not attributable to any additional amounts of catalyst fines in the waste gas. Conventional separation practices have proved to be equally efficient with the crystalline aluminosilicate catalysts as with other cracking catalysts. Thus, it appears that it is the nature of the materials in the regeneration waste gas stream that causes the formation of deposits, but the exact reasons for the deposition of the crystalline aluminosilicate catalyst fines are not clear.

The temperature of the regeneration gases fed to the turbine determines in part the amount of useful power that may be recovered in the system. Within the thermal limits of the materials of the turbine, it is ordinarily desirable to feed the gases at the highest possible temperature. Heretofore, the heat produced in the regeneration zone has often been supplemented by inserting combustion zones between the fines separation zone and the turbine where carbon monoxide is burned to carbon dioxide and additional heat is provided to boost the temperature. It is also possible to supplement the heat provided in the system further by adding a hydrocarbon or other fuel to the combustion zones. The regeneration waste gases typically are produced at temperatures of 1000° F. and higher. Temperatures at the turbine inlet are ordinarily maintained at the highest temperature consistent with the thermal stability of the materials.

It has however now been found that the formation of deposits in power recovery turbines from the use of crystalline aluminosilicate catalysts may be inhibited or prevented altogether. The inhibition or prevention is accomplished by control of the conditions of operation of the power recovery system. More particularly, it is accomplished by operating the system at reduced turbine inlet temperatures.

In the crystalline aluminosilicate catalyst system, however, it has been found that a reduction of the turbine inlet temperature inhibits or prevents the formation of deposits of the catalysts fines on the blades and other parts of the turbine. While the reduction in temperature necessarily entails a sacrifice of recoverable power in the system, it has been found that such a sacrifice is beneficial in maintaining operation of the power recovery system long after catalyst deposits would have necessitated turbine shutdown at higher temperatures, more than compensating for both the loss in turbine efficiency and in power recovery. Additionally, it is, of course, possible to utilize the surplus heat supplied in cooling the gases to the necessary temperature in a waste heat boiler or the like, and to pass the turbine exhaust to a carbon monoxide combustion zone or other heat recovery system to supply additional heat to other points in the reaction system.

It has been found that in order to recover a reasonable amount of power and still avoid the formation of deposits of the catalyst fines in the turbine, the regeneration gases are supplied to the turbine at temperatures up to about 875° F. At the lower temperatures the decrease in the output of the system in general becomes less economic and ordinarily operations at less than about 700° F. may be unattractive under present commercial conditions. It is preferred to operate at temperatures above about 750° F. However, the choice of the lower temperature may be a matter of economic purpose. At temperatures above about 875° F., the crystalline aluminosilicate cracking catalyst fines form deposits in the turbine. Since the gases ordinarily exit from the regeneration at temperatures of at least about 1000° F., some means is used to cool the gas to a suitable temperature before being fed to the turbine.

Various means whereby the gas is cooled are contemplated and any means which serves to reduce the temperture of the regeneration gas is within the scope of the present invention. It is ordinarily desirable to utilize the surplus heat of the gas to provide needed heat elsewhere in the operation, by such means as steam generators and the like.

The catalysts which form deposits in the turbine and are the subject of the present invention are those containing a crystalline aluminosilicate. These materials are known in both naturally-occurring and synthetic forms. Those which have been found advantageous for use as catalysts for cracking or other chemical conversion of hydrocarbons and the like are often characterized by relatively uniform pore size in the range of about 8 to 15 A., preferably about 10 to 14 A., and a silica-to-alumina mole ratio ranging from about 2 to 12:1, preferably about 2 to 6:1. The sodium ions occurring in the generally available forms poison the catalytic activity of crystalline aluminosilicates and are generally removed by ion exchange and replaced by hydrogen, hydrogen precursors such as $NH_4+$, or a cation of a metal from Group IB to Group VIII, inclusive, of the Periodic Table. Frequently the sodium is replaced by a combination of hydrogen or a hydrogen precursor and a metal or a combination of metals. The metals most often utilized are the rare earth metals, especially cerium, or a mixture of rare earth metals such as cerium and lanthanum.

Because of the extreme expense and difficulty in controlling the activity of the ion-exchanged crystalline aluminosilicates, these materials are rarely used alone. Usually such materials are combined with refractory inorganic oxide matrix, such as naturally occurring clays, and the like, and/or synthetic gels, such as alumina, silica-alumina, and the like. Materials suited for use as the inorganic oxide matrix are well-known to the art and are most often oxides of the metals of Groups II to VI, especially III and IV, of the Periodic Table. The crystalline alumnosilicate is generally from about 5 to 95 weight percent of the mixed catalysts, although amounts less than about 50%, e.g. about 10 to 30%, are often preferred from an economic standpoint.

The process of this invention pertains to regeneration of the foregoing crystalline aluminosilicate catalysts in any context wherein the regenerator waste gases to be fed to a power recovery turbine carry catalyst fines. Fluidized catalyst bed reactors utilizing a powder form of the catalyst, that is, where the catalyst particles are principally less than 300 mesh in size and preferably have an average particle size of about 10 to 150 microns, are particularly subject to the entrainment of fines in regeneration waste gases, whether the operation is of the type in which the catalyst particles flow through the reactor with the reactants and are subsequently separated for regeneration, or the type in which the catalyst particles are removed from the reactor separately from the bulk of the hydrocarbon being treated.

Figure 2:
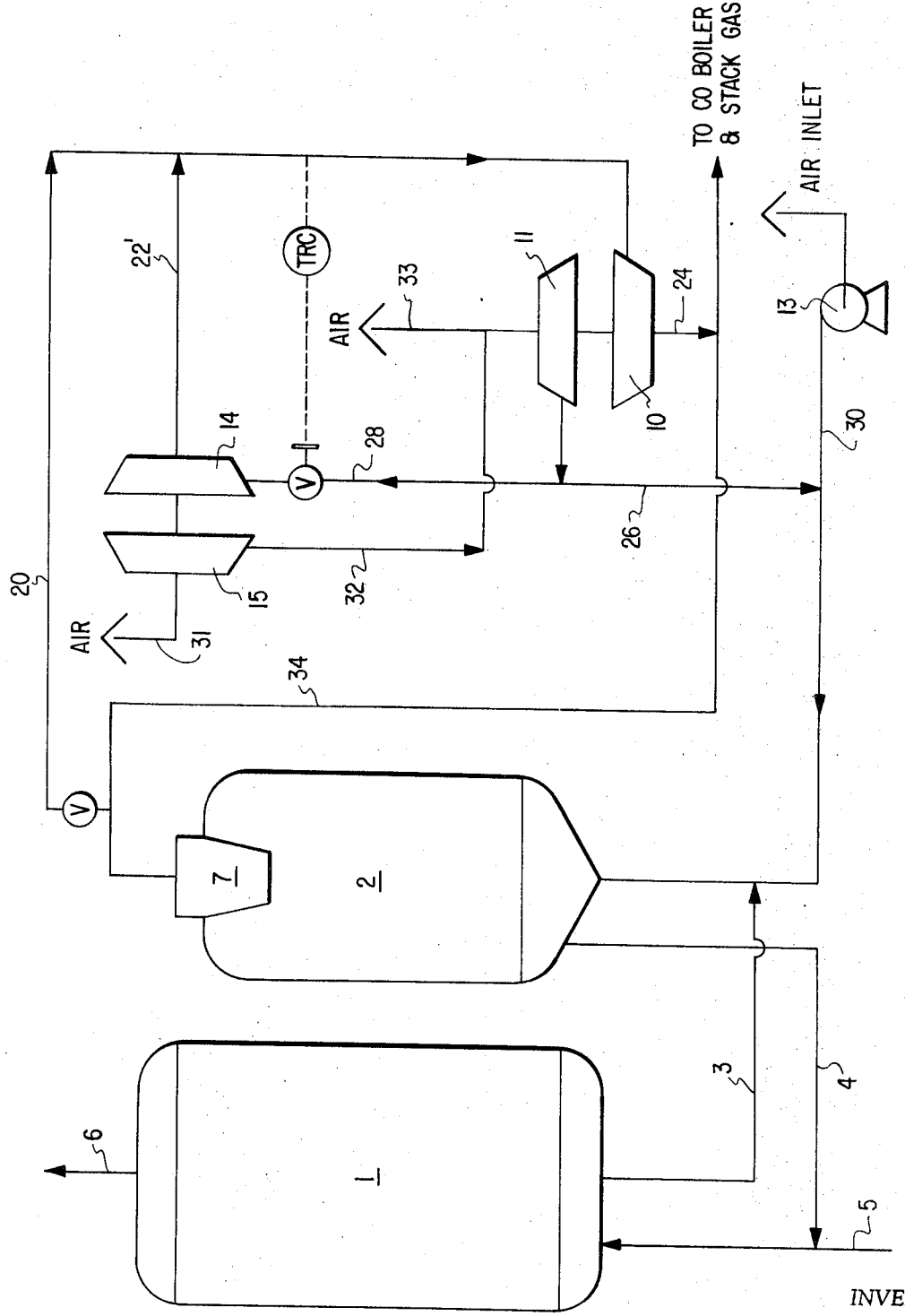

The process of the invention will be seen more clearly with reference to the drawings. FIG. 1, represents a general operation of the process, while FIG. 2 illustrates an alternative operation which is considered desirable.

In FIG. 1, a continuously regenerative fluidized catalyst bed cracking system is shown. In the operation of the basic cracking process, gas, oil or other hydrocarbon cracking feedstock boiling above the gasoline range enters at 5, and is joined by regenerated catalyst passing through conduit 4 and into reactor 1 where the feed is cracked and the cracked products are removed through line 6. Fouled catalyst containing carbonaceous deposits passes from the reactor 1 through conduit 3 and into the regenerator 2 via line 27.

Reactor 1 is operated in the manner known to those skilled in the art. Ordinarily, the cracking feedstock will be a gas oil, boiling primarily above about 400° F., resulting from the fractionation of a crude oil. Most often recycle gas oil also makes up a substantial portion of the feed. The cracking serves to provide a substantial fraction boiling in the gasoline range. Cracking conditions are well known and often include temperatures of about 850 to 1100° F., preferably about 900 to 1050° F. Other reaction conditions usually include pressures of up to about 100 p.s.i.g. oil-to-catalyst ratios of about 5 to 25:1, and space velocities of about 3 to 60. The reaction is generally conducted in the absence of added free hydrogen. In the course of the cracking process, coke and tarry residues deposit on the catalyst and inhibit its cracking activity. The fouled catalyst is then passed to regenerator 2, where the carbonaceous material deposited on the catalyst is removed by burning.

In the regenerator, the residue on the catalyst is removed by air oxidation in the manner known to the art. Regeneration gas, such as compressed air or other oxygen-containing gas, is passed by line 27 into regenerator 2, where it contacts the catalyst and oxidizes the residual material at a temperature ordinarily of about 1000 to 1300° F. The waste gases resulting from the combustion pass through a separating system, such as a cyclone separator 7 or a plurality of such cyclones, which serve to remove a major portion of catalyst fines entrained in the gases. The regenerated catalyst, enhanced in cracking activity is then returned to the cracking reactor by way of line 4.

The waste gases, separated from the bulk of the catalyst, but still containing some fines, leave the regenerator through line 20 and a portion of the stream is withdrawn via line 21 where it is passed through cooling means 9, which may be a steam generator or other system whereby the gases are cooled. The cooled gases in line 22 are recombined with the balance of the regeneration gases in line 20. The amount of the gases withdrawn to be cooled and the temperature of the gases so cooled are balanced so that the temperature of the recombined stream in line 20 is at a temperature in the range of from about 700° F. to about 875° F. The cooled gases then pass through an additional cyclone separator 8, which removes an additional increment of catalyst fines. Line 23 then directs the regeneration gases into the expansion turbine, 10, which exhausts the expanded gases to the atmosphere or to some other energy recovery means, for instance, to a carbon monoxide boiler, where carbon monoxide in the gases is oxidized to carbon dioxide, providing additional heat which may be utilized in any known manner, such as in a steam generator or the like.

Turbine 10, operating under the above-described conditions, serves to produce available rotative horsepower in proportion to the pressure level of the overall system. The turbine may be radial end flow, axial or other common type in use. In this case, turbine 10 is linked to compressor 11, which takes in atmospheric air, via line 25, and compresses it to the pressure required by the regenerator. The turbine also may be linked to some other equipment, such as an electric generator, etc. The compressed air is conducted through line 26, and if necessary is combined with added compressed air from compressor 13 via line 30, through heater 12, and then, as mentioned above, through line 27 to regenerator 2.

In FIG. 2, in which like numerals designate equipment as in FIG. 1, an alternative scheme is provided whereby still greater efficiency is obtained. The regeneration gases leaving the regenerator at about 1000 to about 1300° F., through line 20 are cooled by gases entering the stream via line 22' in an amount sufficient to provide a combined gas stream at a temperature of from about 700° F. to about 875° F. The combined gases then enter turbine 10 and the gases are exhausted as in the method of FIG. 1. Turbine 10 operates compressor 11, which is fed supercharged air from supercharger compressor 15 via line 32, and may also be supplemented by atmospheric air through line 33. A portion of the air in line 26 is withdrawn via line 28 to run supercharger turbine 14. The exhaust of supercharger turbine 14 passes through line 22' to serve as cooling medium for the regeneration gases in line 20 as described above. The amount of air passing through line 28, and thence through turbine 14 and line 22' determines the degree of cooling of the waste gases in line 20. The temperature may be conveniently controlled by providing a temperature recorder-controller, as shown, which proportions the flow of air in line 28 to the temperature of the combined regenerator waste gas and air in line 20. Turbine 14 operates supercharger compressor 15 which is supplied with atmospheric air via line 31.

EXAMPLE I

A 10,000 barrels per day fluid bed catalytic cracker is operated at 900° F., 25 p.s.i.g., and a weight hourly space velocity (WHSV) of 15. The fluidized catalyst is an activated clay-based material containing about 10 weight percent of a cerium- and ammonium-exchanged crystalline aluminosilicate having a pore size of about 13 A. and a silicato-alumina ratio of about 2.5:1. The feedstock is a petroleum gas oil.

The catalyst is continuously cycled between the reactor and regenerator and in the latter the catalyst is regenerated with compressed air at an average temperature of 1150–1200° F. and an average pressure of about 20 p.s.i.g. Compressed air is supplied at a temperature of 335 to 350° F. and a pressure of 27 to 27.5 p.s.i.g. at a rate of about 25,000 s.c.f.m. The regeneration gases pass from the regenerator at a temperature varying from 1170° F. to 1200° F. and a pressure of 20 to 20.2 p.s.i.g. After passing a three stage cycloneseparator , the temperature of the regenerator waste gases passing to the turbine is reduced to 700 to 730° F. The cooling is accomplished by diverting a portion, amounting to about 70 percent, of the waste gas to a heat exchanger where it is cooled to about 485° F. The cooled gas is then recombined with the balance of the original gas. The gases are then fed to an expansion turbine at 19.5 to 19.8 p.s.i.g. The turbine operates an air compressor which delivers compressed air at 335 to 350° F. and 27 to 27.5 p.s.i.g. to the regenerator. After more than 800 hours of operation, no significant amount of catalyst fines are deposited in the turbine.

EXAMPLE II

The process of Example I is repeated under the same operating conditions with the exception that the temperature of the waste gases passing to the turbine is reduced to about 810 to 825° F. by cooling 70 percent to about 700° F. and recombining as before. The turbine is operated continuously for more than 500 hours with no significant deposition of catalyst fines.

For comparison with the process of the present invention, the system is operated as in Examples I and II, but without cooling the waste gases being passed to the turbine. The turbine inlet temperature is about 1060° F. After only 288 hours of operation, catalyst fines deposit in the turbine and compel shut-down.

While the process of the present invention has been described with reference to catalytic cracking, it should be noted that the process is applicable to the utilization of regenerator waste gases from the regeneration of the crystalline aluminosilicate catalysts, as described above, from any type of hydrocarbon conversion process which results in the formation of carbonaceous deposits on the catalyst which are advantageously removed by oxidative regeneration processes. It should be understood that the present invention contemplates any operations which may be desired to cool the regenerator waste gases to a suitable turbine inlet temperature, and is not limited to the particular systems described and exemplified herein.

What is claimed is:

1. A hydrocarbon conversion process wherein a hydrocarbon is processed in a reaction zone in the presence of a crystalline aluminosilicate catalyst to form conversion product and a deposit of carbonaceous material on the catalyst, the steps comprising passing the catalyst to a catalyst regeneration zone, contacting the catalyst at an elevated temperature of at least about 1000° F. with an oxidative regeneration gas, separating the bulk of the regenerated catalyst from the regeneration waste gas, returning the catalyst to the hydrocarbon conversion zone, and cooling resulting waste gas containing catalyst fines from its elevated temperature of at least about 1000° F. to a temperature of from about 700 to about 875° F., and passing the cooled gas to a gas expansion turbine.

2. The process of claim 1 wherein said regeneration gas is air.

3. The process of claim 2 wherein the catalyst is fluidized.

4. The process of claim 3 wherein the catalyst contains a major amount of refractory metal oxide and the crystalline aluminosilicate has a pore size of about 10 to 14° A.

5. The process of claim 4 wherein a portion of said waste gas is cooled and then recombined with the remainder of the regeneration waste gas whereby said combined waste gas is cooled to a temperature of about 750 to 875° F.

6. The process of claim 4 wherein said turbine operates a compressor which supplies compresesd oxygen-containing regeneration gas to said regeneration zone.

7. The process of claim 5 wherein a portion of said waste gas is supplied to a steam generator whereby said portion is cooled and recombined with the uncooled remainder of the regeneration gas whereby the gas is cooled to a temperature of about 750 to about 875° F.

8. The process of claim 4 wherein the waste gas is cooled by the addition of air in an amount sufficient to cool the waste gas to a temperature of about 750 to about 875° F.

9. The process of claim 8 wherein said air is the exhaust of a supercharger, said supercharger serving to supply compresesd air to an air compressor operated by said turbine, which air compressor supplies compressed air to the regeneration zone and to said supercharger.

10. The process of claim 1 wherein the catalyst is fluidized.

References Cited

UNITED STATES PATENTS

| | | | |
|---|---|---|---|
| 3,104,227 | 9/1963 | Pfeiffer et al. | 252—417 |
| 3,394,075 | 7/1968 | Smith | 208—120 |

DELBERT E. GANTZ, Primary Examiner

A. RIMENS, Assistant Examiner

U.S. Cl. X.R.

252—417